Sept. 9, 1958        D. L. RIPLEY        2,851,576
ELECTRIC HEATING
Filed June 4, 1954        5 Sheets-Sheet 1
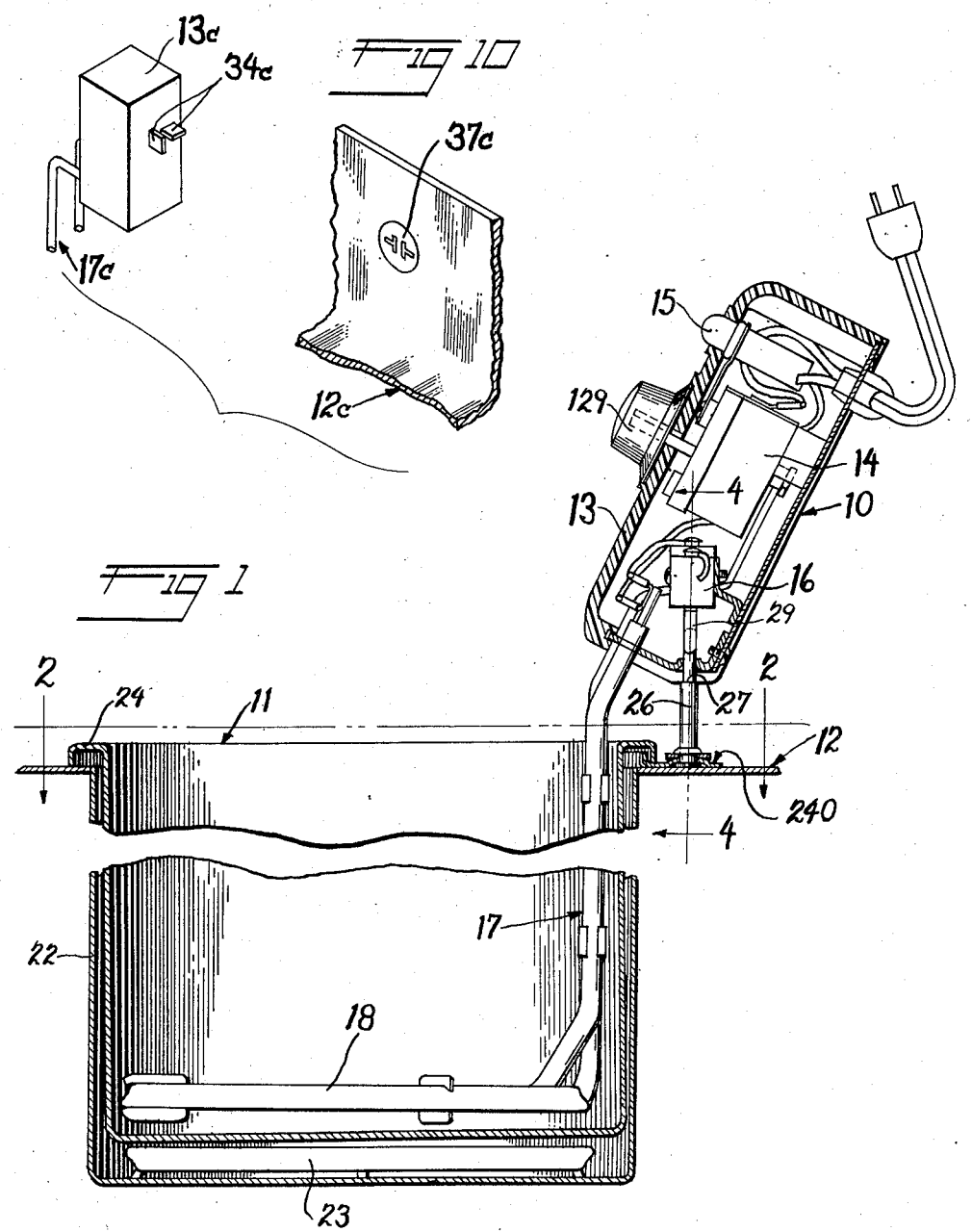
INVENTOR.
DUANE L. RIPLEY
BY
ATTORNEY Sept. 9, 1958 D. L. RIPLEY 2,851,576
ELECTRIC HEATING
Filed June 4, 1954 5 Sheets-Sheet 2
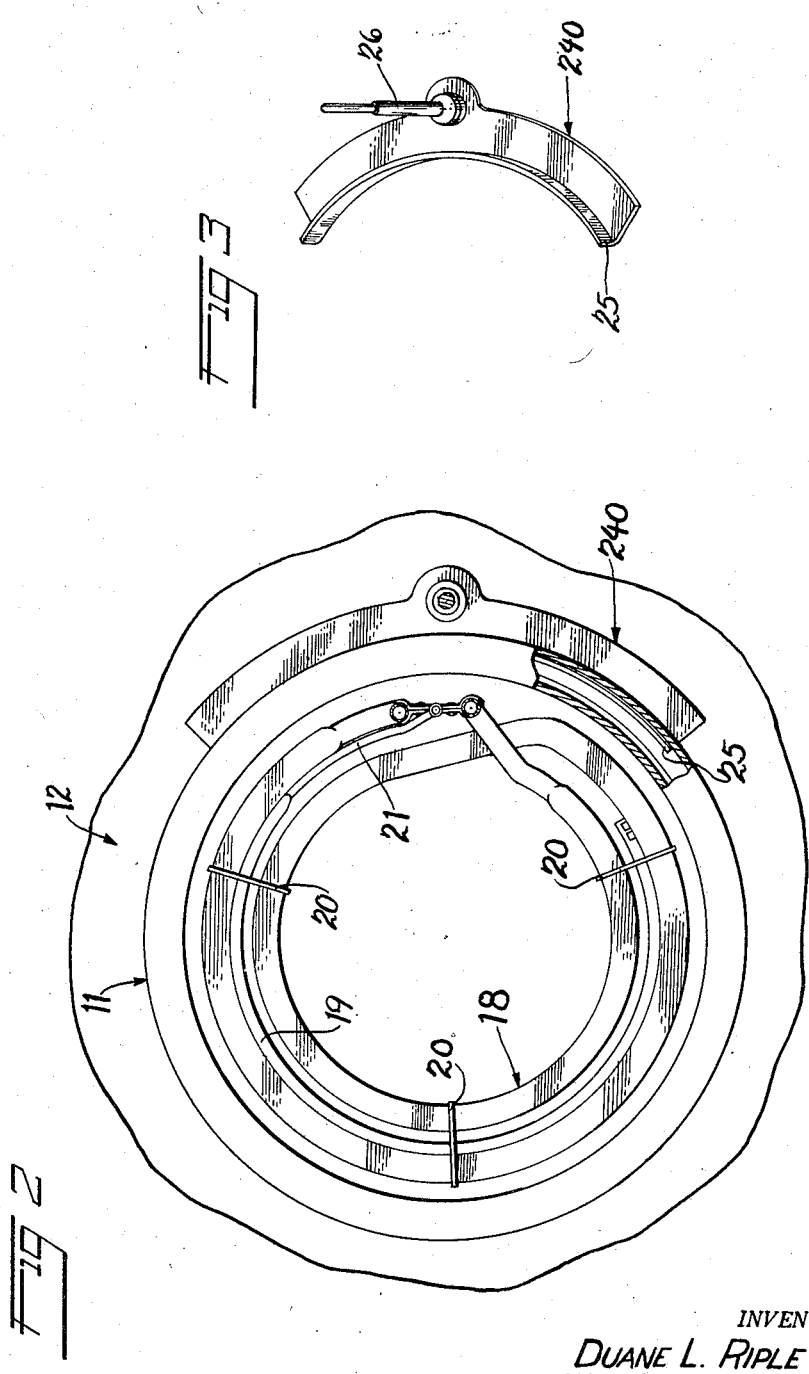
INVENTOR.
DUANE L. RIPLEY
BY Michael Williams
ATTORNEY

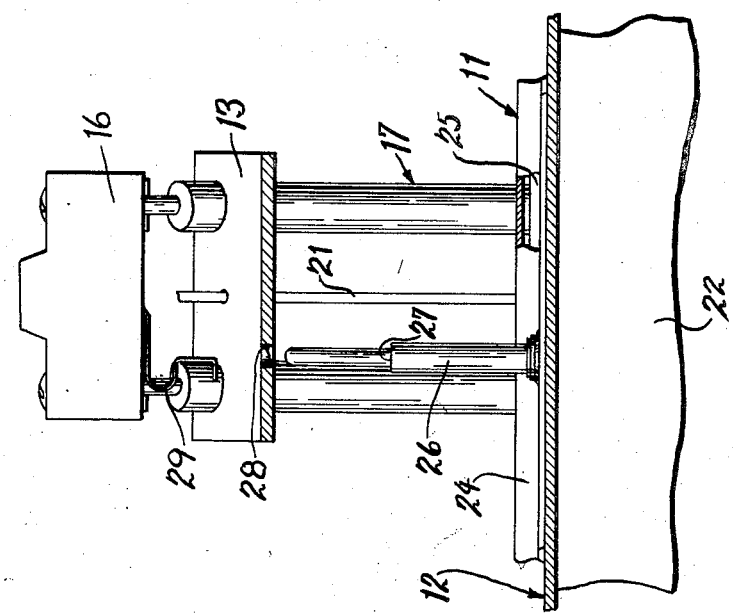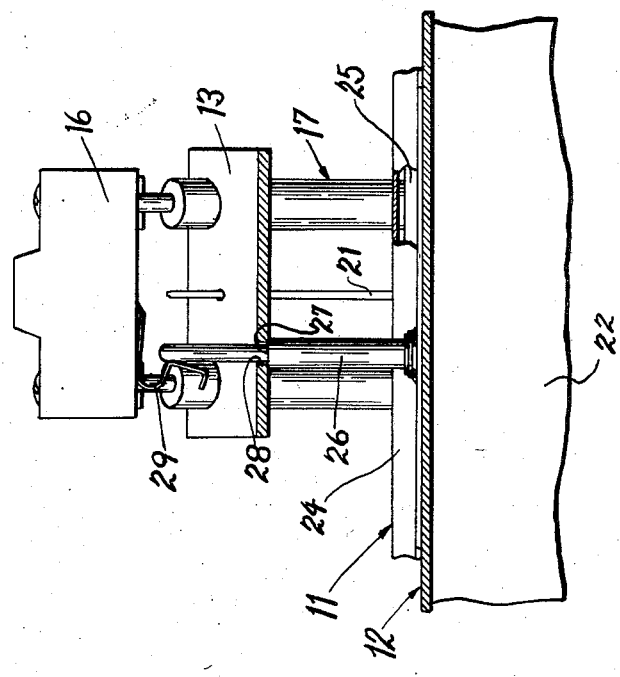

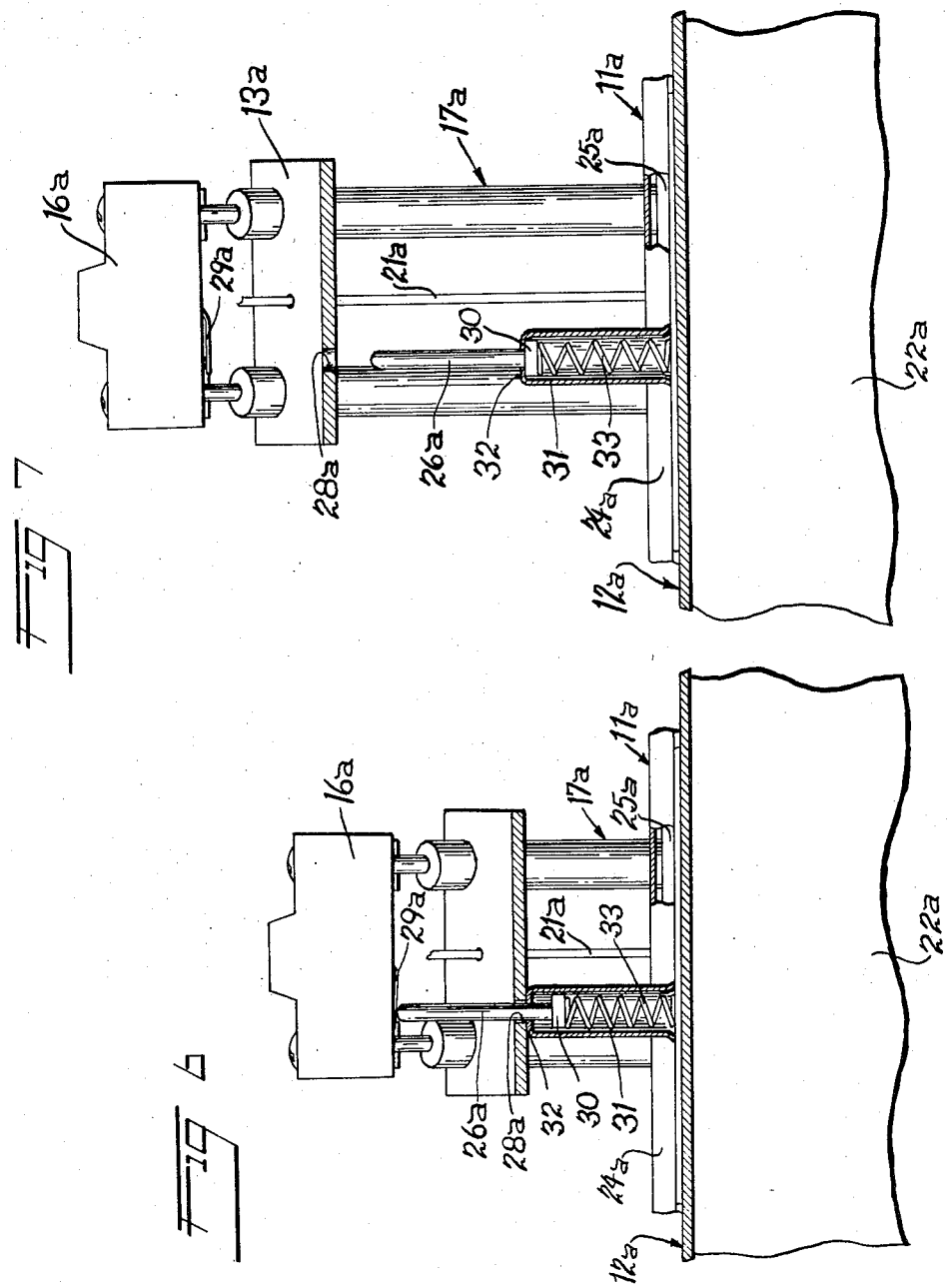

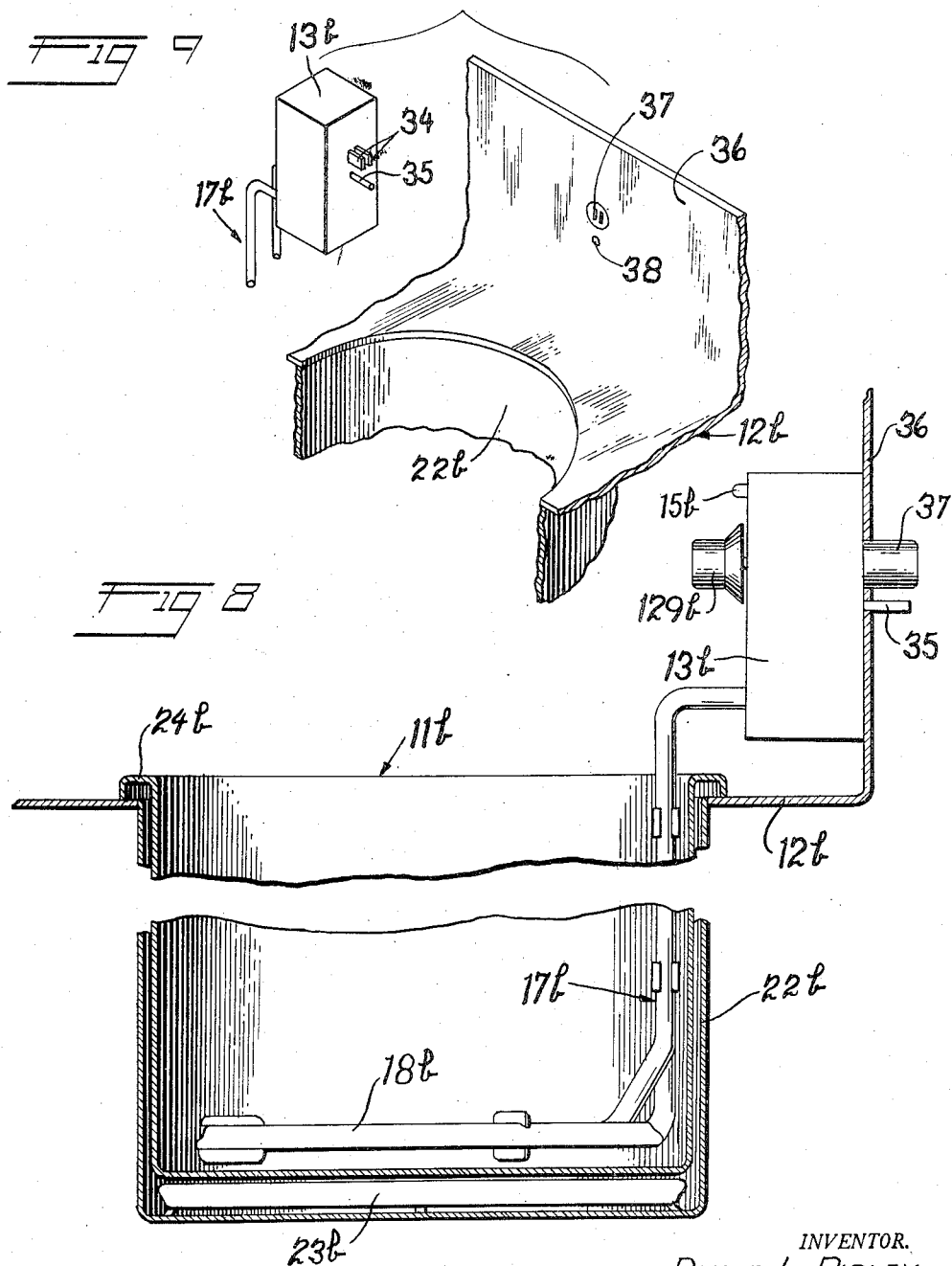

United States Patent Office 2,851,576
Patented Sept. 9, 1958

2,851,576
ELECTRIC HEATING

Duane L. Ripley, Pittsburgh, Pa., assignor to Edwin L. Wiegand Company, Pittsburgh, Pa., a corporation of Pennsylvania Application June 4, 1954, Serial No. 434,462

5 Claims. (Cl. 219—37)

The present invention relates to electric heating, more particularly to an electric heating device which is adapted to be positioned within a deep-well cooking receptacle of a range, and the principal object of my invention is to provide new and improved heating devices of this character.

Electric ranges have long been provided with deep-well cooking receptacles which are adapted to seat in the top of the range, the range also including a heating element which is usually positioned beneath the receptacle for heating purposes. These deep-well cooking assemblies have been satisfactory for stewing and for preparing soups and the like; however, they have not been suitable for use in deep fat frying or for uses where the temperature of the contents of the receptacle must be maintained within relatively narrow limits.

Since the usual range construction merely provides a switch which can be positioned at any one of the several points to preset the amount of heat generated by the heating element positioned beneath the receptacle, it will be clear that the contents of the receptacle can easily become overheated. It will readily be apparent that a great fire hazard exists when heating fat since too high a temperature will cause the fat to burst into flame.

In order to take advantage of the handy location of the deep-well cooking receptacle and to widen the use of the range, attempts have been made in the past to provide a thermostatically controlled electric heater which could be positioned in a deep-well cooking receptacle of a range to provide a deep fat fryer. However, these attempts have not met with commercial success since many otherwise satisfactory devices have been unsafe in that they could be used with receptacles other than the one intended and also used in places other than on the range.

The present invention provides a heating device for use with a deep-well cooking receptacle of a range which is fool-proof in operation in that it can only be used for the purpose and at the place intended. Moreover, at least one embodiment of the device may be employed with any range having a deep-well cooking receptacle regardless of age or manufacture. These and other advantages will become apparent from a study of the following description and from the drawings appended hereto.

In the drawings accompanying this specification and forming a part of this application there are shown, for purpose of illustration, embodiments which my invention may assume, and in these drawings:

Figure 1 is a broken longitudinal sectional view illustrating the use of an embodiment of my invention with a deep-well cooking receptacle of a range, Figure 2 is a fragmentary, horizontal sectional view generally corresponding to the line 2—2 of Figure 1, Figure 3 is a perspective view of a detail, Figure 4 is an enlarged, fragmentary sectional view generally corresponding to the line 4—4 of Figure 1, Figure 5 is a view similar to Figure 4 but showing certain parts in another position, Figure 6 is a view similar to Figure 4 but showing another embodiment of my invention, Figure 7 is a view similar to Figure 6 but showing certain parts in another position, Figure 8 is a view partially in section and similar to Figure 1 but showing still another embodiment of my invention, Figure 9 is a reduced size, exploded, fragmentary perspective view of the embodiment shown in Figure 8, and Figure 10 is an exploded, fragmentary perspective view of a further embodiment of my invention.

As most clearly shown in Figures 1 and 2, the embodiment of the invention therein illustrated comprises an electric immersion heater 10 which is adapted to be positioned within a deep-well cooking receptacle 11 of a range 12. The heater 10 comprises a housing 13 which contains a thermostat mechanism 14, an indicator light 15, and switch apparatus 16. A flexible conductor extends from the upper part of the housing 13 and is provided with a conventional electrical male plug at its free end.

A sheathed electric resistance heating element 17 extends from the lower part of the housing 13 and the active, or heat generating, portion 18 of the heating element is presently formed to provide a plurality of generally concentric coils. A thermostat bulb 19 is positioned adjacent the portion 18 of the element and in the present embodiment the bulb is held in position against one of the coils of the element by means of suitable clamps 20. The usual capillary tube 21 connects the bulb 19 with the mechanism 14 in the housing 13 for a purpose to be hereinafter described.

Referring now to the receptacle 11 and the range 12, it is the usual practice to provide an aperture in the top of the range for receiving the receptacle and to provide a shell 22 which forms a well for the receptacle. A heating element 23 of any suitable type is also usually carried by the shell 22 in position to heat the receptacle when it is positioned as shown in Figure 1.

The receptacle 11, as best shown in Figure 1, has a rim-like flange 24 which overlies the aperture formed in the top of the range and which is engageable with the top of the range to limit downward movement of the receptacle and to support it in position.

Means are provided which cooperate with the heater 10 to permit energization thereof provided certain conditions later to be described are met, and as best shown in Figures 1 and 3, such means comprise an arcuate member 240 having an upwardly extending flange portion 25. A pin 26 is secured to the member 240, as shown, by riveting the pin in position or by any other suitable means. As herein shown, the pin 26 is preferably formed to provide a shoulder 27 for a purpose to be disclosed.

In operation, the receptacle 11 will be positioned within its well in the top of the range in the usual manner and the member 240 moved to a position between the flange 24 of the receptacle and the top of the range as shown in Figure 1. In this position, the pin 26 will extend upwardly of the range and will be held in position by the weight of the receptacle.

The heater 10 will now be grasped by the user and moved downwardly to lower the element 18 into the receptacle and to enter pin 26 in an aperture 28 formed in the housing 13 until the housing abuts the shoulder 27 of the pin. With particular reference to Figure 4, as the pin 26 enters the housing 13, it will engage a lever 29 which is secured to the switch apparatus 16. Movement of the lever 29 by the pin 26 will shift the actuator of the switch and cause internally carried contacts to close. It is to be understood that the contacts of switch apparatus 16 are interposed in the electrical supply circuit to the heating element for a purpose to become clear.

Assuming that the receptacle 11 contains cooking oil or other material, the male plug on the end of the heater conductor will be plugged into the usual appliance outlet of the range or into any other suitable electrical outlet. The thermostat mechanism 14 will then be set to the desired temperature by means of a suitable control 129 (see Figure 1) which extends from the housing 13. Since the contacts of the switch apparatus 16 have been closed as before described by means of the pin 26 and the heater cord has been plugged into the appliance outlet, the heater will operate to heat the contents of the receptacle 11. It will be apparent that the thermostat mechanism 14 will operate in a conventional manner to energize and de-energize the heating element in response to the temperature responsive bulb 19 so as to maintain the contents of the receptacle at a predetermined temperature.

From the foregoing it will readily be apparent that when the heater is removed from the receptacle, switch 16 will de-energize the heating element since pin 26 will be automatically withdrawn from its position within the housing 13 and thus will no longer hold the switch in closed position. Moreover, the necessity of holding switch 16 closed by means of pin 26 will render difficult, if not impossible, the use of the receptacle and the heater in places other than on the range in the manner intended and as heretofore described. Accordingly, the use of my invention is completely safe and requires no more care than that which is necessary in the normal operation of a range.

From the foregoing, it will be seen that the present invention has great utility since it will transform the deep-well cooking receptacle of any range to a convenient, safe and efficient deep fat fryer. Moreover, when the deep-well cooking receptacle is not being used as a deep fat fryer, the heater may be stored out of the way in a cupboard or other convenient place.

Figures 6 and 7 are views of the invention respectively similar to those illustrated in Figures 4 and 5 but illustrating a somewhat modified construction. In this embodiment, parts which are similar to those heretofore disclosed have been identified with the same reference numeral but with the suffix "a" appended.

It will be understood that while Figures 6 and 7 are fragmentary, the necessary cooperating parts which are not shown may be similar to those disclosed in the embodiment illustrated in Figures 1 through 5.

In the modified construction illustrated, pin 26a is not secured directly to the arcuate member 240a but is movable relative thereto. In this embodiment, pin 26a is provided with an enlarged head 30 which is slideable within a tubular housing 31 secured to the arcuate member 240a by any suitable means. The upper end of the tubular housing 31 is closed by a wall 32 which is apertured to pass the pin 26a and a spring 33 yieldably urges the pin upwardly to position wherein the head 30 is engaged with the wall 32 (see Figure 7).

Operation and use of the embodiment shown in Figures 6 and 7 is similar to that described with respect to Figures 1 through 5; however, as this embodiment of the heater is lowered into position, the end of pin 26a will enter the housing 13a through an aperture 28a and will engage a lever 29a which is secured to the switch 16a. It is to be understood that both switch 16a and lever 29a are disposed interiorly of the housing 13a and that the lever is normally accessible from the outside of the housing only through aperture 28a. Continued downward movement of the heater will close the contacts of switch 16a as before described and further downward movement of the heater will move pin 26a downwardly against the urging of spring 33 until the housing 13a of the heater engages housing 31 (see Figure 6) to arrest such further movement. Since the remainder of the construction of the embodiment shown in Figures 6 and 7 is similar to that shown in Figures 1 through 5, it is believed that the foregoing description is sufficiently detailed to provide for a clear understanding of this embodiment of the invention.

The embodiment of the invention illustrated in Figures 8 and 9 differs from that heretofore disclosed in that the construction has been considerably simplified. In this embodiment, the flexible conductor, the switch and the actuating pin have been eliminated; however, similar parts are identified by the same numerals as used heretofore but with the suffix "b" added.

Housing 13b is similar to housing 13 in that it contains a thermostat mechanism and a control knob 129b therefor. A heating element 17b extends from the housing 13b and is supported thereby; however, element 17b extends outwardly from the front of the housing a slight distance and then curves downwardly to meet active portion 18b for a purpose to become clear.

Secured to and extending from the back of housing 13b in electrically insulated relation are a pair of spaced-apart prongs 34 (see Figure 9). These prongs are properly proportioned and spaced-apart to fit with a conventional electrical outlet and the prongs have suitable electrical connections, interiorly of the housing, with the heating element and the thermostat mechanism. Positioned below the prongs 34 and extending from the back of the housing 13b is a pin 35 which is affixed to the housing by any suitable means and for a purpose to be disclosed.

The embodiment of the invention illustrated in Figures 8 and 9 is particularly adapted for use with a range 12b having a rear splash panel 36 and, of course, a recess in which a deep-well cooking receptacle 11b is adapted to be positioned. In the present embodiment, a conventional electrical appliance outlet 37 is provided adjacent the receptacle 11b and is secured to the panel 36 in any suitable manner. An aperture 38 is provided in the panel 36 and is so positioned relative to outlet 37 that it will register with pin 35 when prongs 34 are inserted into the outlet.

Operation of this embodiment is extremely simple since it is only necessary for the user to position the heating element of the heater within the receptacle 11b and then plug the prongs 34 into the outlet 37. It will be understood that pin 35 will enter aperture 38 and not in any way interfere with this operation and it will be understood that energization of the heating element will be effected as soon as the heater is plugged in and the thermostat control 129b is properly set.

An important feature of this embodiment of the invention is that it plugs into a conventional electrical outlet and does not require a special outlet. Accordingly, this outlet may be used for any of the usual appliances when it is not in use with the heater. Since most present-day ranges provide an outlet of this type, there are no additional costs involved in providing a special outlet.

Another important feature of the invention is that although it is employed with a conventional outlet, it can be used only with the outlet provided by the range so as to eliminate the possibility of using the heater for purposes and at places other than that intended. In the event an attempt is made to insert the prongs 34 in a receptacle other than the one provided by the range and which does not have an aperture properly positioned to receive the pin 35, the pin will engage the cover plate of the outlet or other adjacent surface and prevent insertion of the prongs and consequent energization of the heating element.

Although pin 35 is herein shown to be round in cross-section, it may be desirable to employ a pin having a triangular or other cross-section thus necessitating an aperture of a corresponding shape. This would further insure use of the heater only at the place intended since it would make it more difficult for a user to thwart the safety feature of the invention by merely drilling an aperture adjacent an ordinary outlet.

As fragmentarily shown in Figure 10 wherein still another embodiment of the invention is illustrated, it will be noted that this embodiment is similar to that illustrated in Figures 8 and 9. Accordingly, similar parts are identified by the same reference numerals but with the suffix "c" added.

In this embodiment, pin 35 (shown in Figures 8 and 9) has ben eliminated as has aperture 38 in the splash panel of the range. Instead, one of the prongs 34c is preferably so positioned relative to the other that its flat side is horizontal (in the position of parts shown) instead of vertical.

In order to receive prongs 34c and to also accommodate conventional appliance plugs, outlet 37c has, in addition to the usual vertically positioned slots, at least one slot which is positioned horizontally, as shown, for register with the above described horizontally positioned prong 34c.

Since, in the embodiment shown in Figure 10, one of the prongs 34c is positioned so that its flat side is horizontal, the heater can only be plugged into outlets which have a properly positioned horizontal slot in addition to a vertical slot. Accordingly, it will not be possible to create a serious hazard by using the heater with outlets other than the one provided by the range; however, since outlet 37c is also provided with the conventionally positioned slots, the usual appliances may be plugged into this outlet when the heater is not in use.

Additionally, while I have shown only one prong 34c as being positioned horizontally, it will be clear that both prongs may be so positioned if desired. Furthermore, it may be found advantageous to form the prongs 34c to a special shape so that they can be received only within a special outlet carried by the range; however, in this event, the outlet would preferably still carry the usual slots so that ordinary appliances could also be used therewith.

While I have shown and described certain parts of the above embodiment of the invention as being disposed horizontally and vertically, it is to be understood that this has been done for purpose of illustration only and that I may position such parts in other positions if desired.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. An electric heater adapted to be positioned within a deep-well cooking receptacle of a range, comprising a housing formed to provide an aperture, a heating element carried by and extending from said housing, normally open switch means carried interiorly of said housing and preventing energization of said heating element, and means disposed adjacent the mouth of said receptacle and providing for energization of said heating element only when the latter is properly positioned within said receptacle, said means having a projection which enters said housing through said aperture to actuate said switch means and effect energization of said heating element.

2. An electric heater adapted to be positioned within a deep-well cooking receptacle of a range, comprising a housing formed to provide an aperture, a heating element carried by and extending from said housing, normally open switch means carried interiorly of said housing and preventing energization of said heating element, and means disposed adjacent the mouth of said receptacle for supporting said housing in position to dispose said heating element within said receptacle and for actuating said switch means to provide for energization of said heating element only when the latter is properly positioned within said receptacle, said means having a projection which enters said housing through said aperture to support said housing and to actuate said switch means and effect energization of said heating element.

3. An electric heater for use with a deep-well cooking receptacle of a range wherein such receptacle has an outwardly turned flange which engages the range and supports the receptacle thereon, comprising a housing formed to provide an aperture, a heating element carried by and extending from said housing, normally open switch means carried interiorly of said housing and preventing energization of said heating element, and means disposed adjacent the mouth of the receptacle for supporting said housing in position to dispose said heating element within said receptacle and for actuating said switch means to provide for energization of said heating element only when the latter is so supported within said receptacle and when said receptacle is supported by the range with its flange in engagement therewith, said means comprising a member supported by the range adjacent said receptacle and maintained against displacement by engagement beneath the flange of said receptacle, said means having a projection which enters said housing through said aperture provided thereby to support said housing and to actuate said switch means and effect energization of said heating element.

4. In combination: a range having a top surface with an aperture, a deep-well cooking receptacle receivable within said aperture and having an outwardly turned flange engageable with the top surface of said range adjacent said aperture to support said receptacle within said aperture, an electric heater having a housing provided with an aperture, a heating element carried by and extending from said housing and being receivable within said receptacle, normally open switch means carried interiorly of said housing and preventing energization of said heating element, and means for actuating said switch means to provide for energization of said heating element only when the latter is properly positioned within said receptacle and when said receptacle is supported within said range aperture, said means comprising a member supported by said range surface adjacent said range aperture and maintained against displacement by engagement beneath the flange of said receptacle, said means having a projection which enters said housing through said aperture provided thereby to actuate said switch means and effect energization of said heating element.

5. In combination: a range having a top surface with an aperture, a deep-well cooking receptacle receivable within said aperture and having an outwardly turned flange engageable with the top surface of said range adjacent said aperture to support said receptacle within said aperture, an electric heater having a housing provided with an aperture, a heating element carried by and extending from said housing and being receivable within said receptacle, normally open switch means carried interiorly of said housing and preventing energization of said heating element, and means for supporting said heater in position to dispose said heating element within said receptacle and for actuating said switch means to provide for energization of said heating element only when the latter is so supported within said receptacle and when said receptacle is supported within said range aperture, said means comprising a member supported by said range surface adjacent said range aperture and maintained against displacement by engagement beneath the flange of said receptacle, said means having a projection which enters said housing through said aperture provided thereby to support said heater and to actuate said switch means and effect energization of said heating element.

References Cited in the file of this patent

UNITED STATES PATENTS

| | | |
|---|---|---|
| 2,215,929 | Husk | Sept. 24, 1940 |
| 2,282,866 | Hagen | May 12, 1942 |
| 2,350,941 | Stevenson | June 6, 1944 |
| 2,695,947 | Heerdt | Nov. 30, 1954 |
| 2,700,723 | Lynch | Jan. 25, 1955 |
| 2,711,474 | Krichton | June 21, 1955 |